(12) United States Patent
Cecere

(10) Patent No.: US 9,508,074 B2
(45) Date of Patent: Nov. 29, 2016

(54) METHOD FOR SECURE USE OF IDENTIFICATION CARDS

(75) Inventor: Christopher Cecere, North Palm Beach, FL (US)

(73) Assignee: Advanced Platform Solutions LLC, Jensen Beach, FL (US)

( * ) Notice: Subject to any disclaimer, the term of this patent is extended or adjusted under 35 U.S.C. 154(b) by 0 days.

(21) Appl. No.: 12/429,447

(22) Filed: Apr. 24, 2009

(65) Prior Publication Data

US 2009/0283586 A1 Nov. 19, 2009

Related U.S. Application Data

(60) Provisional application No. 61/047,983, filed on Apr. 25, 2008.

(51) Int. Cl.
*G06K 7/00* (2006.01)
*G06Q 20/40* (2012.01)
*G06Q 20/20* (2012.01)

(52) U.S. Cl.
CPC .......... *G06Q 20/4014* (2013.01); *G06Q 20/20* (2013.01); *G06Q 20/40* (2013.01)

(58) Field of Classification Search
USPC ............ 235/375, 379, 380, 487, 492; 705/5, 705/35–45
See application file for complete search history.

(56) References Cited

U.S. PATENT DOCUMENTS

| | | |
|---|---|---|
| 3,511,181 A | 5/1970 | McGiffen et al. |
| 4,507,550 A | 3/1985 | Fleer |
| 4,643,453 A | 2/1987 | Shapiro et al. |
| 4,931,629 A | 6/1990 | Frankfurt |
| 5,432,864 A | 7/1995 | Lu et al. |
| 5,648,647 A | 7/1997 | Seiler |
| 5,979,773 A | 11/1999 | Findley, Jr. et al. |
| 5,984,366 A | 11/1999 | Priddy |
| 6,138,917 A | 10/2000 | Chapin, Jr. |
| 6,256,737 B1 | 7/2001 | Bianco et al. |
| 6,298,441 B1 | 10/2001 | Handelman et al. |
| 6,374,757 B1 | 4/2002 | Farkash |
| 6,802,452 B2 | 10/2004 | Lebaschi et al. |
| 8,365,986 B2 | 2/2013 | Perry, Sr. |
| 2001/0047223 A1 | 11/2001 | Metcalf et al. |
| 2002/0087413 A1 | 7/2002 | Mahaffy et al. |
| 2004/0006695 A1 | 1/2004 | Ishibashi |
| 2005/0080730 A1* | 4/2005 | Sorrentino ............. G06Q 20/02 705/39 |
| 2005/0087598 A1 | 4/2005 | Yamanaka et al. |
| 2005/0097037 A1* | 5/2005 | Tibor ................. G06K 9/00006 705/39 |
| 2005/0211759 A1* | 9/2005 | Breslin et al. ................ 235/375 |
| 2005/0242172 A1 | 11/2005 | Murata |
| 2005/0242173 A1 | 11/2005 | Suzuki |
| 2006/0015730 A1 | 1/2006 | Yuhara |
| 2006/0129485 A1 | 6/2006 | Hamzy et al. |

(Continued)

*Primary Examiner* — Matthew Mikels
(74) *Attorney, Agent, or Firm* — McHale & Slavin, P.A.

(57) ABSTRACT

A method for approving or refusing a transaction is based on the use of an identification card having card data thereon, the card data identifying account information pertaining to the authorized user of the identification card. The method includes storing issuer secondary security data in association with the account information. A transaction approval request is received from a vendor, the transaction approval request including the card data and transaction secondary identifier (secondary ID) data. The transaction is refused if the transaction secondary ID data does not correlate properly to the stored issuer secondary security data. Optionally, a post-transaction confirmation request is issued if the transaction is not refused.

11 Claims, 3 Drawing Sheets

(56) References Cited

U.S. PATENT DOCUMENTS

| | | | |
|---|---|---|---|
| 2006/0273165 A1* | 12/2006 | Swift et al. | 235/383 |
| 2006/0282372 A1 | 12/2006 | Endres et al. | |
| 2007/0145121 A1* | 6/2007 | Dallal et al. | 235/380 |
| 2007/0214093 A1* | 9/2007 | Colella | 705/67 |
| 2007/0250920 A1* | 10/2007 | Lindsay | 726/7 |
| 2007/0287413 A1* | 12/2007 | Kleitsch et al. | 455/405 |
| 2007/0294540 A1* | 12/2007 | Wadayama | 713/186 |
| 2008/0067242 A1* | 3/2008 | Bonalle et al. | 235/380 |

\* cited by examiner

METHOD FOR SECURE USE OF IDENTIFICATION CARDS

CROSS-REFERENCE TO RELATED APPLICATION

This application claims the benefit of U.S. provisional application No. 61/047,983 filed Apr. 25, 2008, the contents of which are incorporated herein by reference in their entirety.

FIELD OF THE INVENTION

This invention relates to prevention of identity theft, and in particular to the prevention of fraudulent transactions using identification cards such as credit cards.

BACKGROUND

The use of a credit card to purchase goods or services is one example of the use of an identification card to facilitate a transaction. In general, identification cards are produced by "issuers" for use by particular individuals ("authorized users") in dealing with others referred to herein as "vendors." Vendors include, for example, providers of goods and/or services. Besides credit cards, other identification cards include debit cards, gift cards, government-issued identification cards, airline tickets, etc., each of which facilitates a kind of transaction between the authorized user and a vendor.

Commonly, data identifying the authorized user to the issuer is stored on the card in electronic form (such as in a magnetic stripe, a bar code, a radio frequency identification (RFID) chip or the like) as "card data" for use by computerized processing systems used by vendors and issuers. For example, by swiping the magnetic stripe of a credit card in a conventional Point of Sale (POS) terminal, a vendor can ask the credit card issuer to approve the transaction and thus assure that the issuer will advance funds to the vendor on behalf of the card user.

It is common to for a vendor and an identification card user to engage in security measures as part of the routine use of the card, e.g., to assure that the person presenting the identification card to the vendor is the authorized user of the card. For example, a credit card user is asked to hand-sign a paper slip so that the signature can be compared to a reference signature on the credit card itself, and a debit card user is asked to key a PIN (personal identity number) into an electronic key pad. In some situations, a card user is asked to present a "picture ID," i.e., a second identification card that bears a photo of the card user together with the card user's name as shown on the credit card.

Despite conventional security measures, a problematic volume of unauthorized uses of identification cards occurs. A common kind of unauthorized use of an identification card is the unauthorized use of a stolen credit card for fraudulent purchases of goods and services. The losses that result from unauthorized use of credit cards are often borne by the card user, the card issuer and/or the vendor. Other kinds of losses and hazards of fraudulent uses of identification cards (such as the admission of an imposter into a restricted area) are sometimes borne by others.

SUMMARY OF THE INVENTION

The present invention resides in one aspect in a method for improving the security of a transaction based on the use of an identification card having card data thereon, the card data identifying account information pertaining to the authorized user of the identification card. The method includes storing issuer secondary security data in association with the account information. A transaction approval request is received from a vendor, the transaction approval request including the card data and transaction secondary identifier (secondary ID) data. The transaction is refused if the transaction secondary ID data does not correlate properly to the stored issuer secondary security data.

The invention resides in another aspect in a method for improving the security of a transaction based on the use of an identification card having card data thereon, the card data identifying account information pertaining to the authorized user of the identification card. The method is practiced by receiving a transaction approval request from a vendor, approving the transaction, and issuing a post-transaction confirmation request after the transaction is approved. Remedial action is taken upon receipt of a repudiation response to the post-transaction confirmation request or upon lack of a response to the post-transaction confirmation request.

The invention resides in another aspect in a method for improving the security of a transaction based on the use of an identification card having card data thereon, the card data identifying account information pertaining to the authorized user of the identification card. This method includes receiving a transaction approval request from a vendor, approving the transaction, and issuing a post-transaction confirmation request after the transaction is approved. A response to the post-transaction confirmation request is received and the response is characterized as a confirmation response or a repudiation response. A confirmation record is made after receiving a confirmation response to the post-transaction confirmation request, or remedial action is taken upon receipt of a repudiation response to the post-transaction confirmation request.

In yet another aspect, a method for improving the security of a transaction based on the use of an identification card having card data thereon, the card data identifying account information pertaining to the authorized user of the identification card, includes storing issuer secondary security data in association with account information. A transaction approval request is received from a vendor, the transaction approval request including the card data and transaction secondary identification (secondary ID) data. The transaction secondary ID data is compared to the stored issuer secondary security data. The transaction is approved and a post-transaction confirmation request is issued after the transaction is approved. A response to the post-transaction confirmation request is received and is characterized as a confirmation response or a repudiation response. A confirmation record is recorded after receiving a confirmation response to the post-transaction confirmation request, and taking remedial action upon receipt of a repudiation response to the post-transaction confirmation request or upon lack of a response to the post-transaction confirmation request.

DETAILED DESCRIPTION OF THE INVENTION

Fraudulent use of an identification card in a transaction between a card user and a vendor is prevented by requiring the user of the card to provide to the vendor the card and a secondary identifier at a point of sale. In accordance with the invention, the issuer of the identification card collects from the authorized user, and records as "account information," basic identity data and other information that is retrievable by reference to an account number uniquely assigned by the issuer to the authorized user. Some of the account information, including the account number, is written onto the card as card data. The issuer also collects secondary ID data from a secondary identifier ("secondary ID") for the authorized user, and derives and stores issuer secondary security data therefrom. The issuer associates the issuer secondary security data with the authorized user's account for future reference in approving or refusing transactions relating to the card. The card data does not include the issuer secondary security data.

When the identification card is later used by the authorized user in a transaction with a third party, i.e., a "vendor", the user presents the identification card to the vendor, and card data is sent to the issuer, enabling the issuer to access the authorized user's account information, including the issuer secondary security data. In addition, the card user provides a secondary identifier for use in the transaction (a "transaction secondary ID") from which transaction secondary ID data is sent to the issuer. The issuer receives the card data and the transaction secondary ID data. The card data allows the issuer to identify the authorized user's account information, to evaluate ordinary conditions for approval of a transaction (e.g., to check the account for adequate available credit), and to quickly access the issuer secondary security data previously recorded by the issuer. If the transaction secondary ID data does not properly correlate to the issuer secondary security data, the issuer refuses to honor or validate the transaction is refused.

In the following described embodiment, the identification card is a credit card, but the present invention is not limited in this regard, as the invention can be implemented with a wide range of identification cards, including debit cards, gift cards, government-issued identification cards, airline tickets, etc.

Figure 1:
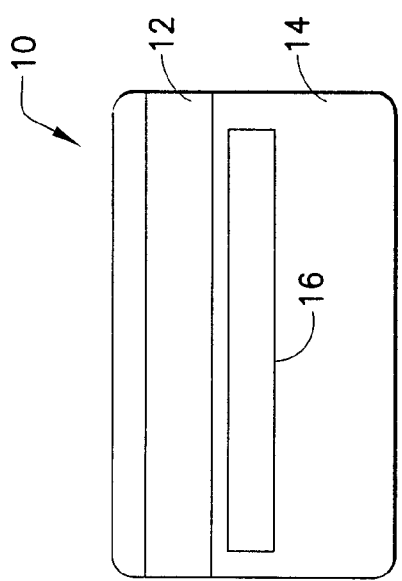
FIG. 1 is a plan view of the back of a credit card for use in a method according to the present invention.

The credit card generally designated by the numeral 10 in FIG. 1 includes a magnetic stripe ("magstripe") 12 on the back 14 of the card. The magstripe 12 contains card data in separate tracks (not shown) in a suitable standard format such as an ISO/IEC ((International Organization for Standardization)/(International Electrotechnical Commission)) standard 7811 used by banks, so that the card data can be read in a standard Point of Sale (POS) card reader terminal. The back 14 of the card 10 includes a signature strip 16 where the credit card user renders a signature for comparison to signatures provided to vendors as a conventional security measure.

The authorized user provides the card issuer with the authorized user's driver's license card as a secondary ID. Preferably, the driver's license card has a magstripe on which is recorded an operator license number that is uniquely assigned to the license holder by a state Motor Vehicle Administrator, and the magstripe is readable by a standard POS terminal card reader. The credit card issuer derives issuer secondary security data from the driver's license card. Deriving issuer secondary security data may simply comprise copying data from the driver's license card or, optionally, encrypting data from the drivers' license card (i.e., subjecting the data to a selected algorithm or mathematical function) so that the issuer secondary security data is distinguishable from data on the secondary ID. The issuer then stores the issuer secondary security data and associates the issuer secondary security data with the authorized user's account information for future use in approving or refusing transactions relating to the card. In one embodiment, the issuer secondary security data is associated with a pre-existing credit card account, and the issuer can call up the account to add the issuer secondary security data thereto by swiping the credit card in a standard card reader.

Figure 3:
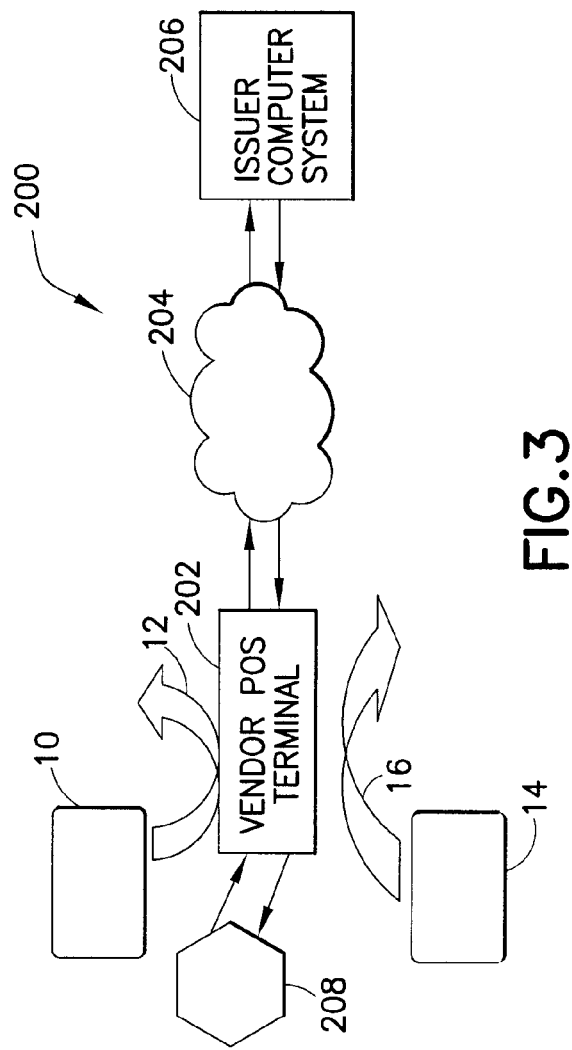
FIG. 3 is a schematic depiction of a digital data network over which methods described herein can be carried out.
Figure 2:
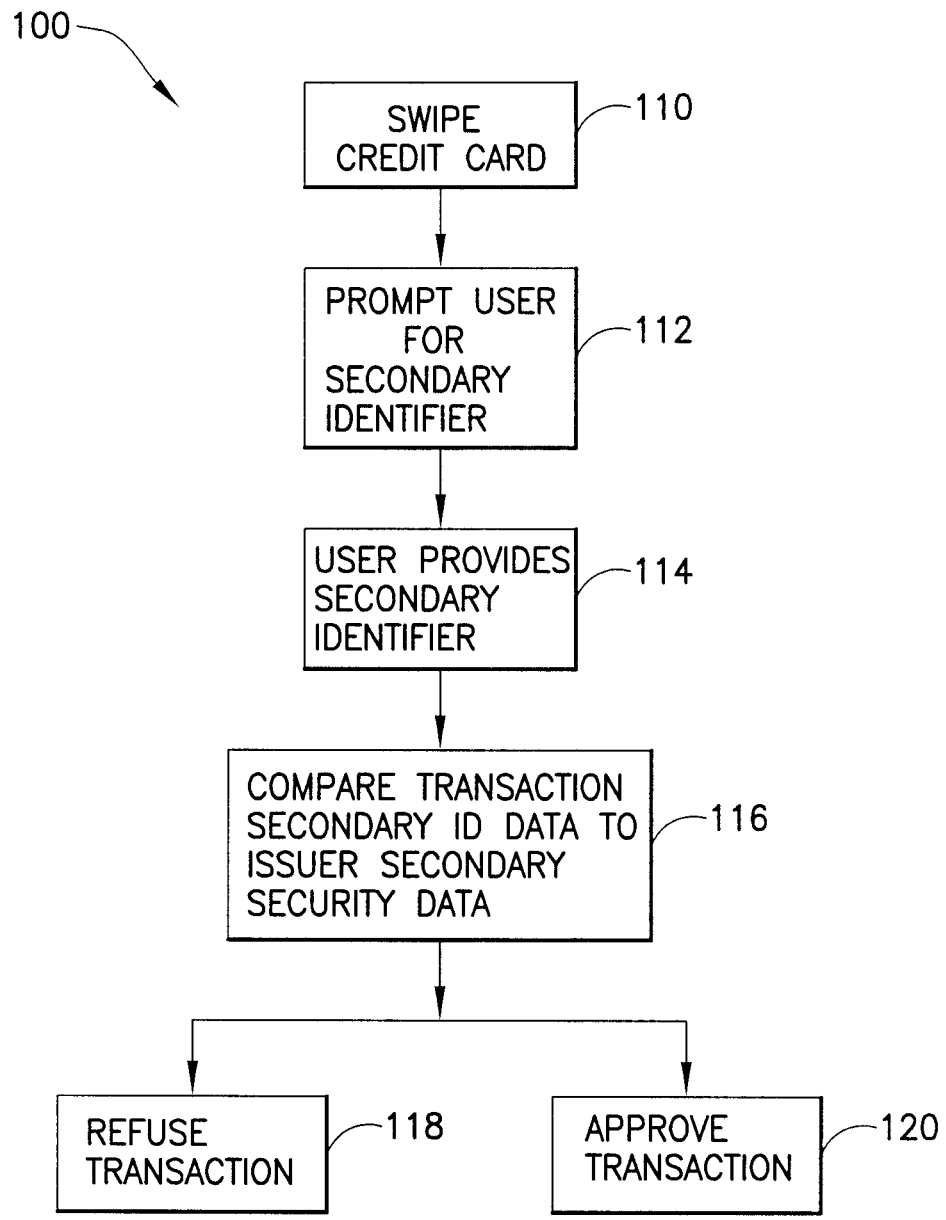
FIG. 2 is a flowchart depicting a method of using the credit card of FIG. 1 according to one particular embodiment of the invention.

In one method of using the credit card 10, generally depicted as method 100 in FIG. 2 which employs the system 200 shown in FIG. 3, the authorized user presents the credit card 10 to a vendor to facilitate a transaction, and the credit card is swiped in a conventional point of sale (POS) terminal 202 as indicated by the arrow 12, in a first step 110. In step 110, the card data is read from the card and is sent over a computer network such as the financial network 204, as part of a transaction request to the issuer, which receives the request in the issuer computer system 206. The issuer computer system 206 contains the account data and is programmed to send and receive data, e.g., data formatted in ISO/IEC ((International Organization for Standardization)/(International Electrotechnical Commission)) standard 7811, and to process such data, including checking to see whether the card data properly correlates to account information stored by the issuer in the issuer computer system 206 and if the other standard conditions of approval are met (e.g., whether the transaction is within the card user's credit limit, whether there is a "hold" on the account, etc.).

In a subsequent step 112, the credit card user is prompted, by a message displayed at the POS terminal 202 at the instruction of the issuer, to provide a secondary ID for the transaction (a "transaction secondary ID"). In step 114, the user provides a transaction secondary ID by swiping a driver's license card 14 having a magstripe through the POS terminal 202 as indicated by the arrow 16. The POS terminal 202 sends transaction secondary ID data from the driver's license card 14 to the issuer. The issuer computer system 206 compares the transaction secondary ID data to the issuer secondary security data associated with the account information in step 116. Comparing the transaction secondary ID data to the issuer secondary security data may include applying the same encryption to the transaction secondary ID data as was applied to secondary ID data to generate the issuer secondary security data. The authorized user knows to provide the same secondary ID at the POS terminal 202 as was used by the credit card issuer to generate the issuer secondary security data, i.e., the authorized user's driver's license card, in order to obtain approval of the transaction. However, if the transaction secondary ID data does not correlate properly to the previously stored issuer secondary security data associated with the authorized user, the transaction is refused (step 118). Regardless of whether the transaction secondary ID data correlates properly to the issuer secondary security data, the transaction may be refused if other conditions are not met (e.g., if the transaction amount is not within the authorized user's credit limit, if there is a "hold" on the account, etc.). If there is a proper correlation between the transaction secondary ID data and the issuer secondary security data and all other conditions imposed by the issuer are satisfied, the card issuer approves the transaction in step 120. All communication between the POS terminal and the issuer takes place via a standard financial telecommunication network and the functions of the issuer are computer-automated for access to the vendor over the network.

In the method 100 described herein, the issuer prompts the card user to provide the secondary ID (e.g., the driver's license card 14) after the credit card 10 has been swiped, but this is not a limitation on the invention, and in other embodiments, the user may swipe the credit card and the transaction secondary ID before the initial transaction request is sent, so that the card data and the transaction secondary ID data are presented together in the transaction request. In this way, the need for the prompt at step 112 is obviated.

Furthermore, in the described method 100, the transaction secondary ID is a driver's license card 14, i.e., a document with pertinent data recorded in a magstripe that is readable by the POS terminal, but the invention is not limited in this regard, as other secondary ID documents may be used to generate issuer secondary security data and transaction secondary ID data within the scope of the present invention. For example, the secondary ID may be a driver's license with information thereon in the form of a bar code that must be scanned to provide the transaction secondary ID data. In other embodiments, the secondary ID may be a document other than a driver's license, provided that the document contains numerical data from which generate issuer secondary security data and transaction secondary ID data can be generated. Preferably, the secondary ID data is substantially unique to the credit card user. Suitable secondary ID documents other than a driver's license include passports, birth certificates, student identification cards, government-issued identification cards, etc.

According to yet another embodiment, the credit card issuer may generate a secondary ID document for the credit card user, so that the issuer secondary security data is based on data that is newly associated with the credit card user. For example, a secondary ID card issued by the credit card issuer may contain a 10-digit random number uniquely assigned by the credit card issuer to the authorized user of the credit card, and the issuer secondary security data may be the assigned 10-digit random number or may be derived from the assigned 10-digit random number.

Preferably, a secondary ID document includes a photo of the authorized user as well as secondary ID data, for supplemental visual verification of the user's identity by the vendor at the POS.

While the invention is described herein in relation to an identification card (i.e., a credit card) and a secondary ID document having magstripes, this is not a limitation on the invention, and in other embodiments, one or both of the identification card and the secondary ID document may be "smart cards" (i.e., cards containing memory chips and/or radio frequency identification (RFID) circuits), cards having data recorded thereon in bar codes, or any combination thereof.

In still other embodiments, the secondary ID need not be a document. For example, the secondary ID may be a biological characteristic of the authorized user, e.g., a fingerprint, from which a biometric of the authorized user (e.g., a fingerprint scan) can be derived, using a POS terminal 202 which comprises an appropriate biometric scanner 208. The issuer secondary security data may be derived from the biometric, i.e., the biometric itself may serve as the issuer secondary security data, or the issuer may apply encryption to the biometric to produce the issuer secondary security data. Scans of biological characteristics other than fingerprints may serve as biometrics from which the issuer secondary security data is derived, e.g., iris scans, voice prints, hand geometry, retinal scan, facial characteristics, DNA sequence characteristics, and hand writing samples, etc. When the credit card user is prompted at the POS to provide a secondary ID, the vendor may provide a scanner by which the credit card user can provide an appropriate biometric (a fingerprint scan, iris scan, retina scan, voice print, etc.) as a source of transaction secondary ID data to compare to the previously stored issuer secondary security data. An iris scan is a convenient biometric because it can often be obtained unobtrusively at a distance from the credit card user's face.

Optionally, the issuer secondary security data is derived from a plurality of secondary IDs, at least two of which must be provided at the POS in order to obtain approval of the transaction. For example, one of the secondary IDs may be a document such as a driver's license, and another secondary ID may be a biological aspect of the credit card user such as a fingerprint, and both the driver's license and the fingerprint scan may be required in addition to the transaction card as a condition of approving the transaction.

In still another embodiment, the card issuer is a retailer which issues the card to its customers, and the card is limited to use in purchasing the retailer's goods and/or services.

Figure 4:
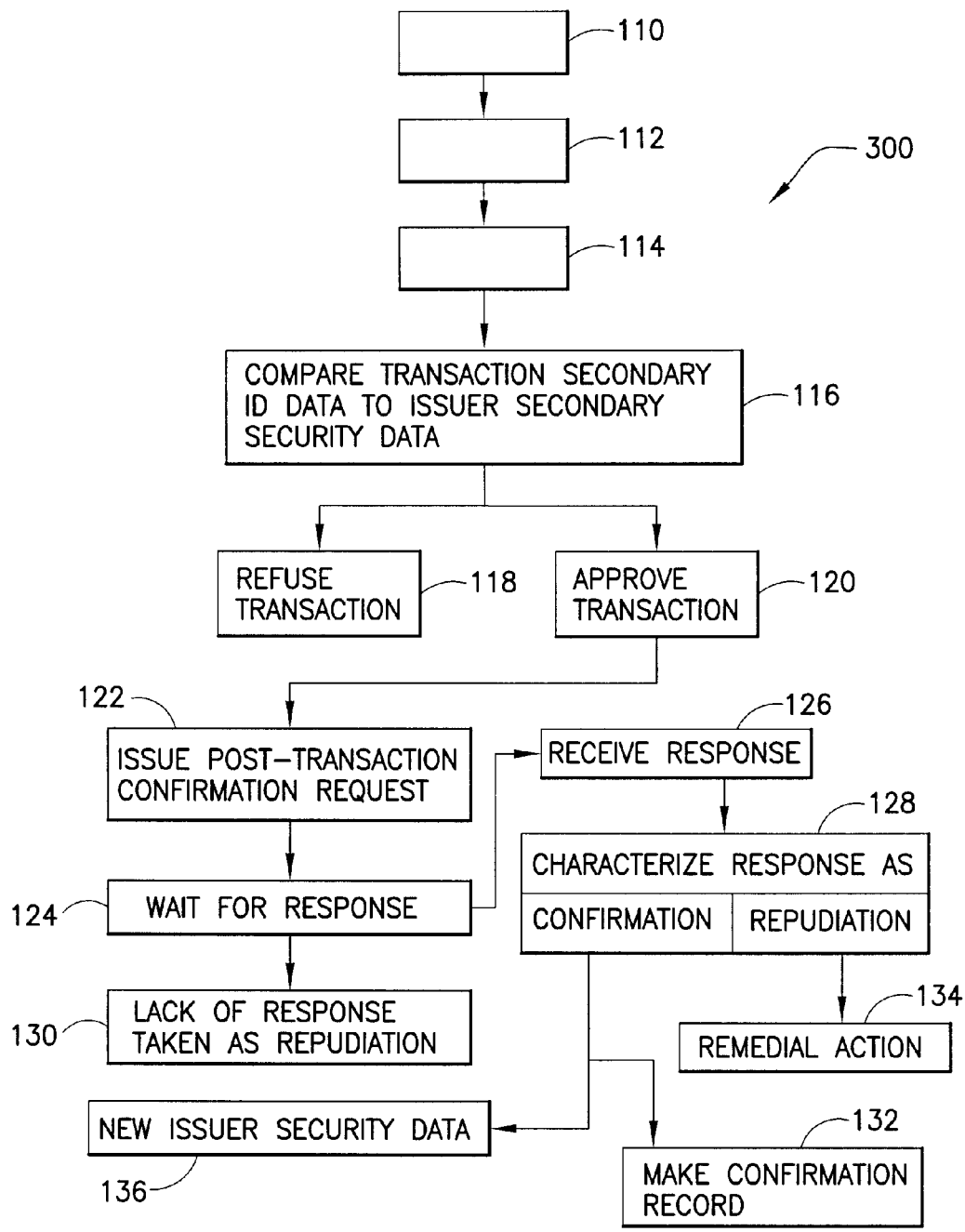
FIG. 4 is a flowchart depicting a method of using the credit card of FIG. 1 according to another embodiment of the invention.

In another embodiment, a method for the use of an identity card may include issuing a post-transaction confirmation request after a transaction based on the identity card is approved. One example of such a method, indicated at 300 in FIG. 4, optionally incorporates the steps of method 100 and further includes, after approving the transaction in step 120, the step of issuing to the card holder a post-transaction confirmation request (step 122) and allowing a period for reply to the post-transaction confirmation request (step 124). If the card data or the card itself has been used by an unauthorized user, e.g., in a fraudulent transaction, the post-transaction confirmation request will be unexpected by the card holder, who can alert the card issuer that an unauthorized transaction has occurred, for example, by responding appropriately to the post-transaction confirmation request. The post-transaction confirmation request may provide information about the transaction to enable the card holder to recognize the transaction, e.g., the transaction amount, date, time, the identity of the vendor, etc. A post-transaction confirmation request may take various forms, for example, the post-transaction confirmation request may be a voice message that the card issuer sends to the card holder's cell phone, or a text message sent to the user's cell phone using an SMS format, or an email sent to an email address agreed upon by the card holder and the card issuer. The card issuer may issue a post-transaction confirmation request for all transactions involving the card, but the invention is not limited in this regard, and in other embodiments, the card holder issue a post-transaction confirmation request only for some transactions. For example, for financial transactions, the card issuer may set a threshold amount at and above which a post-transaction confirmation request is issued, but below which no post-transaction confirmation request is issued.

While method 300 begins with the steps of method 100, the invention is not limited in this regard, and in other embodiments, another transaction approval method may be employed before the transaction is approved and a post-transaction confirmation request is issued in step 122.

In one embodiment the method may include allowing a card holder to respond to a post-transaction confirmation request. Optionally, one or more appropriate responses to a post-transaction confirmation request can be agreed upon between the card issuer and the card holder in advance of the post-transaction confirmation request.

When a response to a post-transaction confirmation request is received in step 126 the card issuer may characterize the card holder's response in step 128 as either a confirmation response, i.e., a confirmation of the transaction, or as a repudiation response, i.e., a repudiation of the transaction. Optionally, the card issuer may send a message to the card holder's cell phone and invite the card holder to reply in a specified way to indicate that the transaction in question was an approved transaction, and any other response (optionally including no response) may be interpreted as a repudiation of the transaction. In one embodiment, the post-transaction confirmation request may be a text message which requests that the card holder reply with text message which constitutes a confirmation of the transaction. For example, the post-transaction confirmation request may request a confirmation response comprising a message containing the number "1" if the transaction was approved by the card holder or a repudiation response comprising a message containing the number "9" if the transaction was not approved. Alternatively, the post-transaction confirmation request may be a phone call to the card holder's cell phone with an interactive voice message that invites the card holder to provide a confirmation response or a repudiation response by voice or by pressing one or more keypad keys. Optionally, a lack of confirmation response within the time period allotted for response may be interpreted by the card issuer in the same was as a repudiation response in an optional step 130, although the invention is not limited in this regard, and in other embodiments, only the receipt of a repudiation reply is treated as a repudiation of the transaction.

In one embodiment, the response content constituting a confirmation response is not revealed in the post-transaction confirmation request but instead is agreed upon in advance between the card holder and the card issuer as a preselected confirmation response. The preselected confirmation response may be included in card holder's account information held by the card issuer. For example, upon receipt of a post-transaction confirmation request the card holder may reply with a preselected confirmation response comprising a voice message that contains a preselected word, or by keying in a preselected code. Optionally, a preselected confirmation response is effective only for one-time use, after which another preselected confirmation response is agreed upon.

In one embodiment, a confirmation record is made in step 132 after receipt of a confirmation response. The confirmation record may include data that identifies the confirmation response, e.g., the time, date, content of the confirmation response. On the other hand, in reply to a repudiation response, or in reply to the lack of a timely confirmation response, the card issuer can take remedial action in step 134, e.g., the card issuer may decline or limit subsequent transactions based on the card, impose a transaction value limit on the card holder's account, alert the merchant and/or the authorities to the possibly fraudulent use of the card, etc.

In another embodiment, upon approval of a transaction the card issuer may cancel the issuer secondary security data in the customer account and provide the card holder, with new secondary security data in step 136, to be used in a subsequent transaction. Optionally, the new secondary security data may accompany the post-transaction confirmation request, but the invention is not limited in this regard, and in other embodiments, the new secondary security data may be provided separately from the post-transaction confirmation request.

Optionally, for a transaction that is refused in step 118 may be followed by remedial action taken in step 134. The remedial action may optionally include cancelling the existing issuer secondary security data and generating new issuer secondary security data.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

Although the invention has been described with reference to particular embodiments thereof, it will be understood by one of ordinary skill in the art, upon a reading and understanding of the foregoing disclosure, that numerous variations and alterations to the disclosed embodiments will fall within the scope of this invention and of the appended claims.

What is claimed is:

1. A method for improving the security of a credit card transaction based on the use of an identification card having card data thereon, the method comprising:
   choosing issuer secondary security data from a credit card user's secondary ID document, said secondary ID document selected from the group of: driver's licenses, passports, birth certificates, credit cards, debit cards, gift cards, airline tickets, or identification cards;
   storing and encrypting the issuer secondary security data in association with a credit card user's account information;
   transmitting a transaction approval request from a vendor to the issuer, the transaction approval request comprising credit card data, the credit card data comprising the credit card user's account information, whereby, receipt of the credit card data by the issuer prompts the credit card user to provide transaction secondary security data stored on a smart card, magstrip, bar code, RFID or combination thereof;
   transmitting the transaction secondary security data from the credit card user's secondary ID document to the issuer;
   comparing the credit card data with the credit card user's account information;
   comparing the transaction secondary security data transmitted to the issuer secondary security data, the issuer secondary security data having been previously stored and encrypted in association with the credit card user's account information; and
   refusing the transaction if the transaction secondary security data does not correspond to the issuer secondary security data stored in association with the credit card user's account information, and
   allowing the transaction if the transaction secondary security data does correspond to the issuer secondary security date stored in association with the credit card user's account information.

2. The method of claim 1 wherein the issuer secondary security data is derived from a biometric based on a biological aspect of the credit card user.

3. The method of claim 2 wherein the biometric is derived from an electronic file based on the credit card user's fingerprint, iris or voice.

4. The method of claim 1 wherein the issuer secondary security data is derived from a plurality of secondary IDs.

5. The method of claim 4 wherein the issuer secondary security data is derived from a secondary ID document and a biometric based on a biological aspect of the card user.

6. A method for improving the security of a transaction based on the use of an identification card having card data thereon, the method comprising:
choosing issuer secondary security data from a card user's secondary ID document having secondary data placed on said secondary ID, said secondary ID document selected from the group of: driver's licenses, passports, birth certificates, credit cards, debit cards, gift cards, airline tickets, or identification cards;
storing and encrypting the issuer secondary security data in association with the card user's account information;
receiving a transaction approval request from a vendor, the transaction approval request comprising card data, the card data comprising the card user's account information, whereby, receipt of the card data by the card issuer prompts the card user to provide transaction secondary security data;
comparing the card data with the credit card user's account information;
transmitting the transaction secondary security data from the credit card user's secondary ID document to the issuer;
comparing the transaction secondary security data to the issuer secondary security data stored in association with the credit card user's account information;
approving the transaction when the transaction secondary security data corresponds with the issuer secondary security data;
issuing a post-transaction confirmation request after the transaction is approved; and
taking remedial action upon receipt of a repudiation response to the post-transaction confirmation request or upon lack of a response to the post-transaction confirmation request;
replacing the issuer secondary security data with new issuer secondary security data after the transaction.

7. The method of claim 6, wherein the post-transaction confirmation request comprises a cell phone text message, an interactive cell phone message, an email, or a combination of two or more thereof.

8. A method for improving the security of a transaction based on the use of an identification card having card data thereon, the method comprising:
choosing issuer secondary security data from a card user's secondary ID document, said secondary ID document selected from the group of: driver's licenses, passports, birth certificates, credit cards, debit cards, gift cards, airline tickets, or identification cards;
storing and encrypting the issuer secondary security data in association with a card user's account information;
receiving a transaction approval request from a vendor;
transmitting card data from a user to the issuer;
receiving a request from the issuer for transaction secondary security data, said transaction secondary security data stored on a magstripe of a second card;
transmitting the transaction secondary security data from the credit card user's secondary ID document to the issuer;
comparing the transaction secondary security data to the issuer secondary security data stored in association with the credit card user's account information;
approving the transaction;
issuing a post-transaction confirmation request after the transaction is approved;
receiving a response to the post-transaction confirmation request; characterizing the response as a confirmation response or a repudiation response; and
recording a confirmation record after receiving a confirmation response to the post-transaction confirmation request or taking remedial action upon receipt of a repudiation response to the post-transaction confirmation request.

9. The method of claim 8, further comprising replacing the issuer secondary security data with new issuer secondary security data after the transaction.

10. The method of claim 8, wherein the post-transaction confirmation request comprises a cell phone text message, an interactive cell phone message, an email, or a combination of two or more thereof.

11. A method for improving the security of a transaction based on the use of an identification card having card data thereon, the method comprising:
choosing issuer secondary security data from a secondary ID document, said secondary ID document selected from the group of: driver's licenses, passports, birth certificates, credit cards, debit cards, gift cards, airline tickets, or identification cards;
storing and encrypting the issuer secondary security data in association with account information;
receiving a transaction approval request from a vendor, the transaction approval request including transaction card data, the transaction card data comprising identifying account information pertaining to the authorized user of the identification card, and secondary document data placed on a secondary ID;
comparing the transaction card data with the credit card user's account information;
comparing the secondary document data to the issuer secondary security data stored in association with the credit card user's account information;
approving the transaction when the secondary document data corresponds with the issuer secondary security data;
issuing a post-transaction confirmation request after the transaction is approved; and
receiving a response to the post-transaction confirmation request; characterizing the response as a confirmation response or a repudiation response; and
recording a confirmation record after receiving a confirmation response to the post-transaction confirmation request or taking remedial action upon receipt of a repudiation response to the post-transaction confirmation request or upon lack of a response to the post-transaction confirmation request.

* * * * *